(12) United States Patent
Anderson et al.

(10) Patent No.: US 12,253,998 B1
(45) Date of Patent: Mar. 18, 2025

(54) SYSTEM AND METHOD FOR QUALIFYING COLLECTED DATA

(71) Applicant: Validate Me LLC, Stamford, CT (US)

(72) Inventors: James Anderson, Morris Plains, NJ (US); Thomas J. Saleh, Stamford, CT (US)

(*) Notice: Subject to any disclaimer, the term of this patent is extended or adjusted under 35 U.S.C. 154(b) by 108 days.

(21) Appl. No.: 18/138,609

(22) Filed: Apr. 24, 2023

Related U.S. Application Data

(63) Continuation-in-part of application No. 17/962,718, filed on Oct. 10, 2022, now Pat. No. 12,153,587, which is a continuation-in-part of application No. 17/674,945, filed on Feb. 18, 2022, now Pat. No. 11,593,415, and a continuation-in-part of application No. 17/519,634, filed on Nov. 5, 2021, now Pat. No. 12,001,529, said application No. 17/674,945 is a continuation-in-part of application No. 17/519,634, filed on Nov. 5, 2021, now Pat. No. 12,001,529.

(51) Int. Cl.
G06F 16/23 (2019.01)

(52) U.S. Cl.
CPC ...... *G06F 16/2365* (2019.01); *G06F 16/2358* (2019.01)

(58) Field of Classification Search
CPC .................. G06F 16/2365; G06F 16/2358
See application file for complete search history.

(56) References Cited

U.S. PATENT DOCUMENTS

| | | | | |
|---|---|---|---|---|
| 8,965,762 B2* | 2/2015 | Song | ............... | G10L 25/63 |
| | | | | 704/231 |
| 10,086,291 B1* | 10/2018 | Wisler | ............... | G06F 16/40 |
| 10,542,021 B1* | 1/2020 | Mehr | ............... | H04L 63/1416 |
| 10,810,055 B1* | 10/2020 | Walker | ............... | G06F 16/2358 |
| 11,307,734 B1* | 4/2022 | Shrivastava | ........ | G06F 3/04842 |
| 11,388,371 B1* | 7/2022 | Paepcke | ............... | H04N 7/157 |
| 11,608,074 B2* | 3/2023 | Boss | ............... | B60W 50/0098 |
| 11,704,431 B2* | 7/2023 | Kraus | ............... | H04L 63/0414 |
| | | | | 726/26 |
| 11,929,095 B1* | 3/2024 | Libin | ............... | G11B 27/005 |
| 2008/0154917 A1* | 6/2008 | Gounares | ............... | G06Q 10/10 |
| 2011/0201960 A1* | 8/2011 | Price | ............... | A61B 5/01 |
| | | | | 600/300 |

(Continued)

*Primary Examiner* — Aravind K Moorthy
(74) *Attorney, Agent, or Firm* — Gugliotta & Gugliotta LPA

(57) ABSTRACT

An improvement to a system for identity verification is provided in which data records are continuously updates to provide the validation, verification and trusted confidence values of an entity (an individual person or organization) for each type and level of identification needed. In addition to the iterative updating of conventional data, the historical change in recorded data is compared with newly received entity identification verification parameters, with changes and an analysis of the changes also iteratively tracked and stored as part of the data record with continuous updating. The data record may also include emotional, mood or feelings responses to emotional, mood or feeling prompts. Similarly, the historical change in emotional, mood or feeling responses is compared with newly received responses to similar or different prompts, with changes and an analysis of the changes also iteratively tracked and stored as part of the data record with continuous updating.

10 Claims, 4 Drawing Sheets

(56) References Cited

U.S. PATENT DOCUMENTS

| | | | |
|---|---|---|---|
| 2012/0151585 A1* | 6/2012 | Lamastra | H04L 51/58 |
| | | | 726/24 |
| 2012/0290662 A1* | 11/2012 | Weber | G06N 20/00 |
| | | | 715/835 |
| 2015/0317465 A1* | 11/2015 | McCarty | G06F 16/2365 |
| | | | 726/19 |
| 2016/0025850 A1* | 1/2016 | Rigsby | G01S 13/72 |
| | | | 342/61 |
| 2016/0217322 A1* | 7/2016 | Kim | G10L 15/063 |
| 2016/0287079 A1* | 10/2016 | Pradeep | G06N 5/022 |
| 2017/0310820 A1* | 10/2017 | Kao | G10L 25/90 |
| 2017/0357847 A1* | 12/2017 | Jabri | G06T 7/73 |
| 2018/0048615 A1* | 2/2018 | Barajas Gonzalez | |
| | | | G06F 16/248 |
| 2018/0048721 A1* | 2/2018 | Barajas Gonzalez | |
| | | | G06F 3/0482 |
| 2018/0174457 A1* | 6/2018 | Taylor | G06N 3/045 |
| 2019/0089701 A1* | 3/2019 | Mercury | G06Q 10/105 |
| 2019/0230170 A1* | 7/2019 | Marlin | G06F 16/9535 |
| 2019/0324958 A1* | 10/2019 | Ow | H04L 9/3247 |
| 2020/0019635 A1* | 1/2020 | Poirel | G06F 16/24568 |
| 2020/0118042 A1* | 4/2020 | Wang | G06N 20/00 |
| 2020/0134084 A1* | 4/2020 | Rakshit | G06F 16/285 |
| 2020/0134296 A1* | 4/2020 | Rajvanshi | G06V 10/82 |
| 2020/0214626 A1* | 7/2020 | Boyle | A61B 5/6896 |
| 2020/0236143 A1* | 7/2020 | Zou | G06F 21/1078 |
| 2020/0288204 A1* | 9/2020 | Duersch | G06F 18/23213 |
| 2021/0065854 A1* | 3/2021 | Hanold | G16H 15/00 |
| 2021/0097168 A1* | 4/2021 | Patel | G06F 21/554 |
| 2021/0150140 A1* | 5/2021 | Galitsky | G06F 16/9027 |
| 2021/0150398 A1* | 5/2021 | Bastide | G06N 7/01 |
| 2021/0157795 A1* | 5/2021 | Dutta | G06F 16/2379 |
| 2021/0266180 A1* | 8/2021 | Sehgal | H04L 9/0637 |
| 2021/0390876 A1* | 12/2021 | Publicover | G06N 3/04 |
| 2022/0198263 A1* | 6/2022 | Guo | G06Q 50/01 |
| 2022/0335340 A1* | 10/2022 | Moustafa | G06N 20/00 |
| 2022/0377028 A1* | 11/2022 | Wang | G06V 10/454 |
| 2022/0382727 A1* | 12/2022 | Rao | G06F 11/1438 |
| 2022/0397686 A1* | 12/2022 | Scacchi | G01S 19/485 |
| 2024/0094801 A1* | 3/2024 | Fox | A61B 5/16 |
| 2024/0143941 A1* | 5/2024 | Wu | G06N 3/044 |
| 2024/0259416 A1* | 8/2024 | Miyake | H04L 63/102 |
| 2024/0330267 A1* | 10/2024 | Kaidi | G06F 16/2379 |

* cited by examiner

SYSTEM AND METHOD FOR QUALIFYING COLLECTED DATA

RELATED APPLICATIONS

Previously filed and co-pending applications of related continuity are further disclosed as part of the Application Data Sheet filed pursuant to 37 C.F.R. § 1.76. All Related Applications are incorporated by reference as if fully rewritten herein.

BACKGROUND OF THE INVENTION

1. Field of the Invention

The present invention relates generally to a system and method for decision making in managing digital identities and, more particularly, to a system and method for qualifying collected data for use therein.

2. Description of the Related Art

Identity management solutions exist that are designed to facilitate the management of digital identities and operations such as authentication in real-world application. As described in the Related Applications identity verification, authentication, and other decision making analysis using online information retrieval and data classifications have limitations and drawbacks. As described in U.S. application Ser. No. 17/674,945 and U.S. application Ser. No. 17/962,718, (incorporated by reference as if fully rewritten herein) an improved Decision Making Analysis Engine is described in which enhanced data source collection is used in support of identity management. The improvements described in these applications teach utilizing enhancements of collected data from online sources. Such enhancements may be generated from within the document itself, and from identifying and applying a "quality" and "credibility" level to the document from additional data.

Intra-documentary enhancements may be generated from context between the online source or document and a related named entity. A data chain of textual document data, special characters, and programming content or programming identifiers can be used to associate between a data item and a named entity. Textual document data from within the document, such as identifying parts of speech within, can assist in determining the quality and credibility level of the document as it relates to the named entity. For example, such an intra-document parsing can identify whether the document is directly related to an entity (e.g., "John Smith attended the annual Bilderberg meeting . . . ") or indirectly about the entity (e.g., "John Smith, rumored to be a regular attendee of annual Bilderberg meetings . . . "). Or, such a parsing can similarly identify whether the entity's reference is less directly related to the document (e.g., "John Smith, a Bilderberg Group conspiracy theorist . . . "). Such differences can generate a higher quality/credibility determination (the former), or a lesser quality/credibility determination (the latter) when deciding to what level the document and its contents should be considered in decision making about John Smith. John Smith's relationship to the Bilderberg Group may have little or no weight in deciding if John Smith should be leased a new cellular phone. John Smith's relationship with the Bilderberg Group may possibly have more weight in deciding if he should be hired for a public facing position, such as a company president, or a political appointment such as Ambassador to Switzerland. In any case, subjective positive or negative weighting would be the determination of the decision maker.

Additionally, inter-documentary enhancements may also be generated from context between online sources or documents and a related named entity. Data relationships between documents may skew such quality/confidence levels of the documents and, by extension, other information gleaned from the document. For example, John Smith's name being listed on, or absent from, a Bilderberg Group published list of meeting attendees can be used to change the quality and confidence levels of those other documents. Additionally, other documented data placing John Smith in Montreux, Switzerland between 30 May to 2 Jun. 2019 may reinforce this relationship with between John Smith and Bilderberg, while other documented data placing John Smith in New Delhi, India at that same time may diminish such a relationship.

Additionally used in current identity management solutions may use interactive services that provide some proof of using challenges or emotional or behavioral metrics unique to an individual. The Related Applications, especially as disclosed in U.S. application Ser. No. 17/519,634 (incorporated by reference as if fully rewritten herein) further improve upon this by accumulating behavioral and emotional metrics and enhancing them over time.

Ultimately, a sentiment analysis, or deciding if the information extracted is positive, negative, or neutral with regards to the topic/topics and entity/entities discussed in the text, must be performed. And if neutral, decide whether or not to discard as irrelevant.

Consequently, a need exists for improvement in behavioral tracking and for analyzing emotions, moods, and feelings in order to continue to improve data source collection and its use in support of identity management.

SUMMARY OF THE INVENTION

It is thus the object of the present invention to provide a system and method for qualifying collected data for use in decision making in managing digital identities.

It is a feature of the present invention to qualify online related data using analysis of behavior and emotional, mood and feelings (EMF).

The present invention provides a system for qualifying collected data using behavior data analysis and tracing as part of manufacturing and validating event-relevant identifications ("IDs"), tagged with both Trust and Confidence Scores, for Specific Entities (Individuals and Enterprises) and their Prosoponyms using a Managed Secure-Immutable-Nonreputable-Replicated-Verifiable and Fault-Tolerant Distributed Datastore via an Ensemble-Based Network of both Existing and Newly-Created Heterogenous Single- and Multi-Factor ID Validation Services. The ensemble network consisting of both Commercial Organizations (known as Members) requiring valid Entity IDs for use during various events, such as purchase transactions, and Service Providers (known as Partners) who supply technology services for ID validation (as standalone services or as licensed by Members). Acquisition of all data is obtained digitally, including both data of the type that has been created digitally, and data of the type that was created physically but has been digitized to produce a digital version, over the ensemble network.

The present invention acts as an intelligent gateway to the validation, verification and trusted confidence values of an entity (an individual person or organization) for each type and level of identification needed. Utilizing a distributed network and a peer-to-peer blockchain system on a combination of distributed and centralized systems, rules and preferences of the type of validation, as well as the results to process, may be implemented, checked and cross-checked concerning the identification of an entity, and further monitoring and analyzing incorporated validation data as it changes over time. According to one aspect of the present invention, the historical change in recorded data is compared with newly received entity identification verification parameters, with changes and an analysis of the changes also iteratively tracked and stored as part of the data record with continuous updating. According to another aspect of the present invention, the data record may also include emotional, mood or feelings responses to emotional, mood or feeling prompts. Similarly, the historical change in emotional, mood or feeling responses is compared with newly received responses to similar or different prompts, with changes and an analysis of the changes also iteratively tracked and stored as part of the data record with continuous updating.

By tracking historical data changes and analyzing a vector of changes, confidence scores and/or trust scores can be further augmented with additional data that is independent of the contents of any other specific available data already available.

Further, the use of emotional, mood or feelings responses proves yet more data for consideration within a confidence score and/or trust score that is independent of the contents of any other specific available data already available.

Further objects, features, elements, and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. Further, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Figure 1:
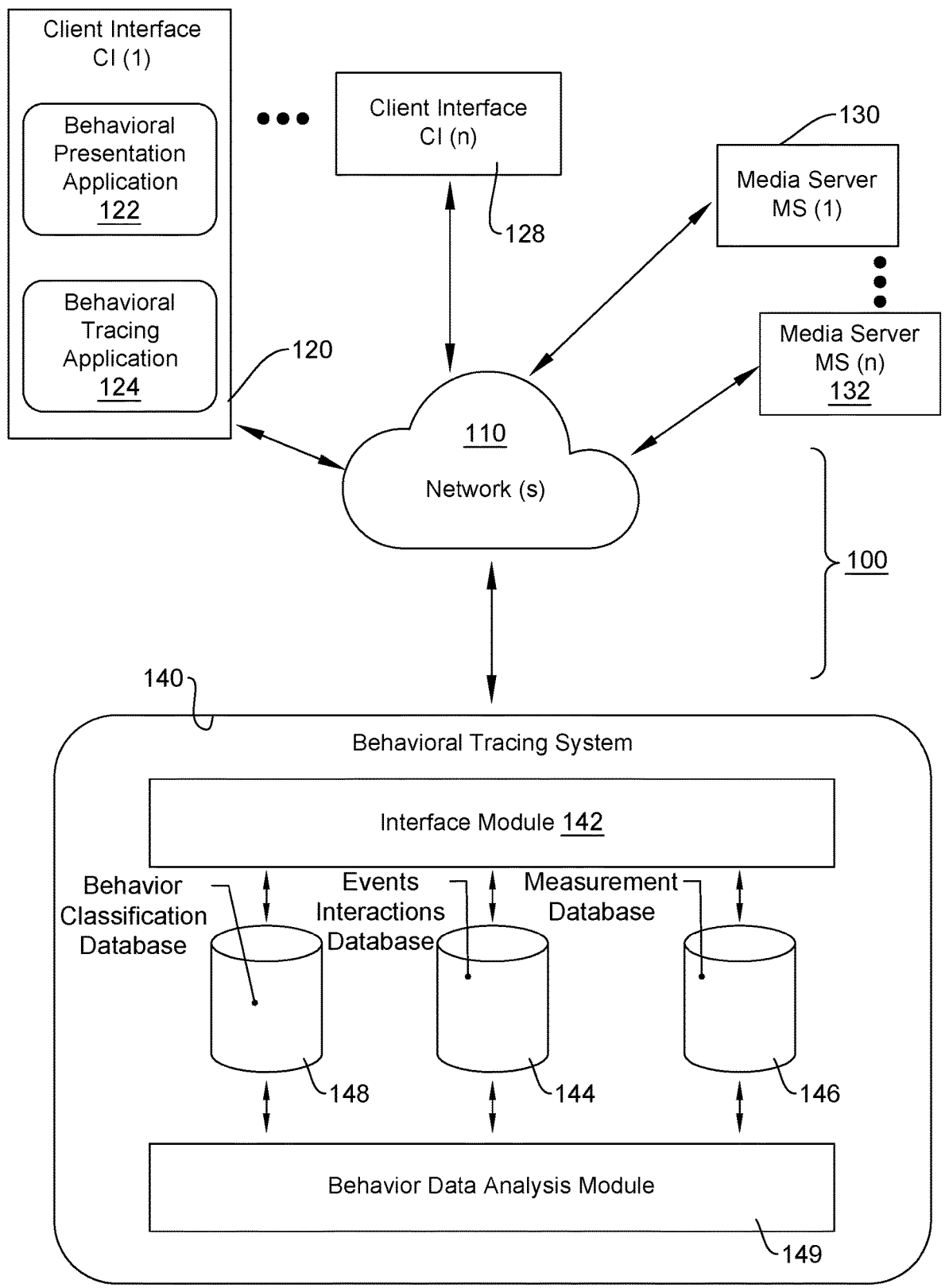
FIG. 1 is a schematic block diagram of a system for qualifying collected data using behavior data analysis and tracing according to the preferred embodiment of the present invention.

Referring now to the drawings, wherein like reference numerals indicate the same parts throughout the several views, improvements in managing digital identities with qualifying collected data is shown according to the preferred embodiment of the present invention. As shown in conjunction with FIG. 1, a system for qualifying collected data using behavior data analysis and tracing is shown, generally noted as 100, for use in providing both proof ("trust score") and confidence levels of identity at a given moment ("system"). Communicating over one or more networks 110, a client interface 120 may be used to access collected data server 130 and a behavioral tracing system 140.

The networks 110 may be any wide area network or, preferably, an ensemble network of clients in communication with network enabled data, documents, information, etc. and the behavioral tracing system. The network structure for the system 100 may further comprise an ensemble network in which public network elements, cloud networks and enterprise networks are in operational communication, and may include both centralized and federated identity verification services in a manner to provide an ability to pool the identity-verification abilities of potential competitors.

The client interface 120 may be used to access a behavioral presentation application 122 and a behavioral tracing application 124, generated from the behavioral tracing system 140. The behavioral presentation application 122 may be used to access prompted behavioral indicium from the media server 130 for presentation to a client. The behavioral tracing application 124 may be used to acquire reaction interactions to the behavioral indicator. The networked interaction of the client interface 120 allows for a plurality of client interfaces 128 to operate simultaneously.

The media server 130 retains collected data of query-response challenges, checking both answers and time-to-respond, involving personal history and/or recent transactions, direct examination of transaction history data, web presence, behavioral observations using social media posts, biometrics such as facial recognition, eyeball scans, fingerprints, voice prints, keyboard typing speed and patterns, gait, etc. The networked interfacing of the media server 130 allows for a plurality of media servers 132 to be utilized and operated simultaneously in parallel.

The behavioral tracing system 140 provides the analysis between the acquired information from the client interface 120 in response to the content from the media server 130. Behavioral observations of the client using social media posts, biometrics such as facial recognition, eyeball scans, fingerprints, voice prints, keyboard typing speed and patterns, gait, etc. may be inputted through an interface module 142, where the content and observational feedback is categorized and saved in the events interaction database 144. Behavioral observations are measured, and a historical archive is maintained in a measurement database 146. Behavioral events and observations may further be classified, with the classifications archived in a behavior classification database 148. As will be described in greater detail below, a behavior a data analysis module 149 actively traces changes and behavioral responses and provides an analysis of differential changes in client response in relation to recorded historical norms.

Figure 2:
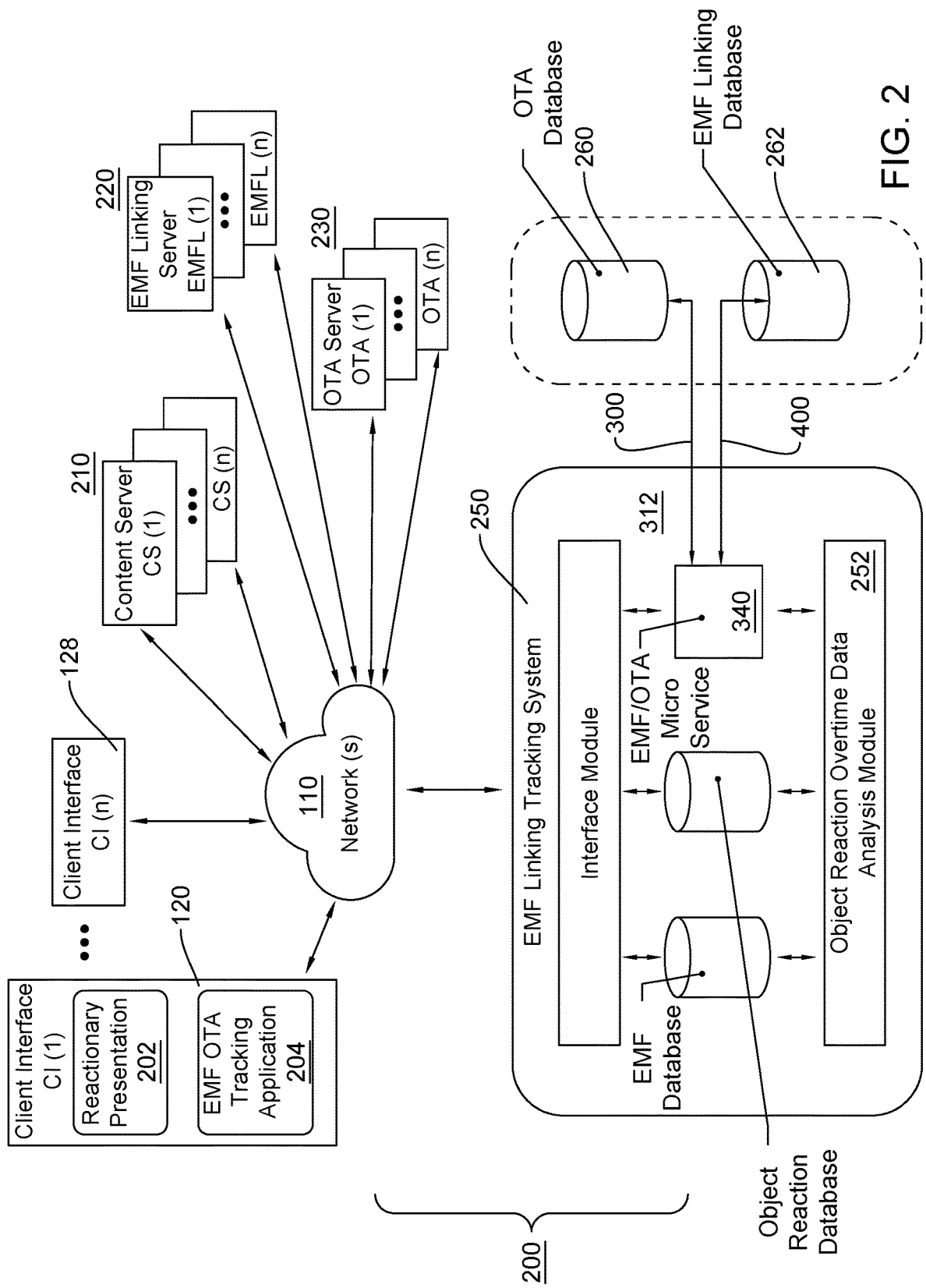
FIG. 2 is a schematic block diagram of a system for qualifying collected data using EMF linking and tracking according to the preferred embodiment of the present invention.

As shown in conjunction with FIG. 2, a system for qualifying collected data using Emotional-Mood-Feelings (EMF) linking and tracking, generally noted as 200, is shown within the scope of the present invention. The client interface 120 may be used to access a reactionary presentation application 202 and a tracking application 204 for analyzing EMF changes over time, as described in greater detail below. An EMF tracking system 250 interacts with one or more content server(s) 210, one or more EMF linking server(s) 220, and over-time-analysis (OTA) server(s) 230. The reactionary presentation application 202 may be used to access analysis of the EMF linking tracking system 250 in coordination with input from the content server(s) 210, EMF linking server(s) 220, and OTA server(s) 230.

The EMF linking tracking system 250 may be used to analyze differences in emotions, moods and feelings as reaction responses to events and/or prompts as described in greater detail below. Continuous tracking of behavior changes is retained within an overtime analysis database 260. Analysis prompts and response are retained within an EMF linking database 262.

Figure 3:
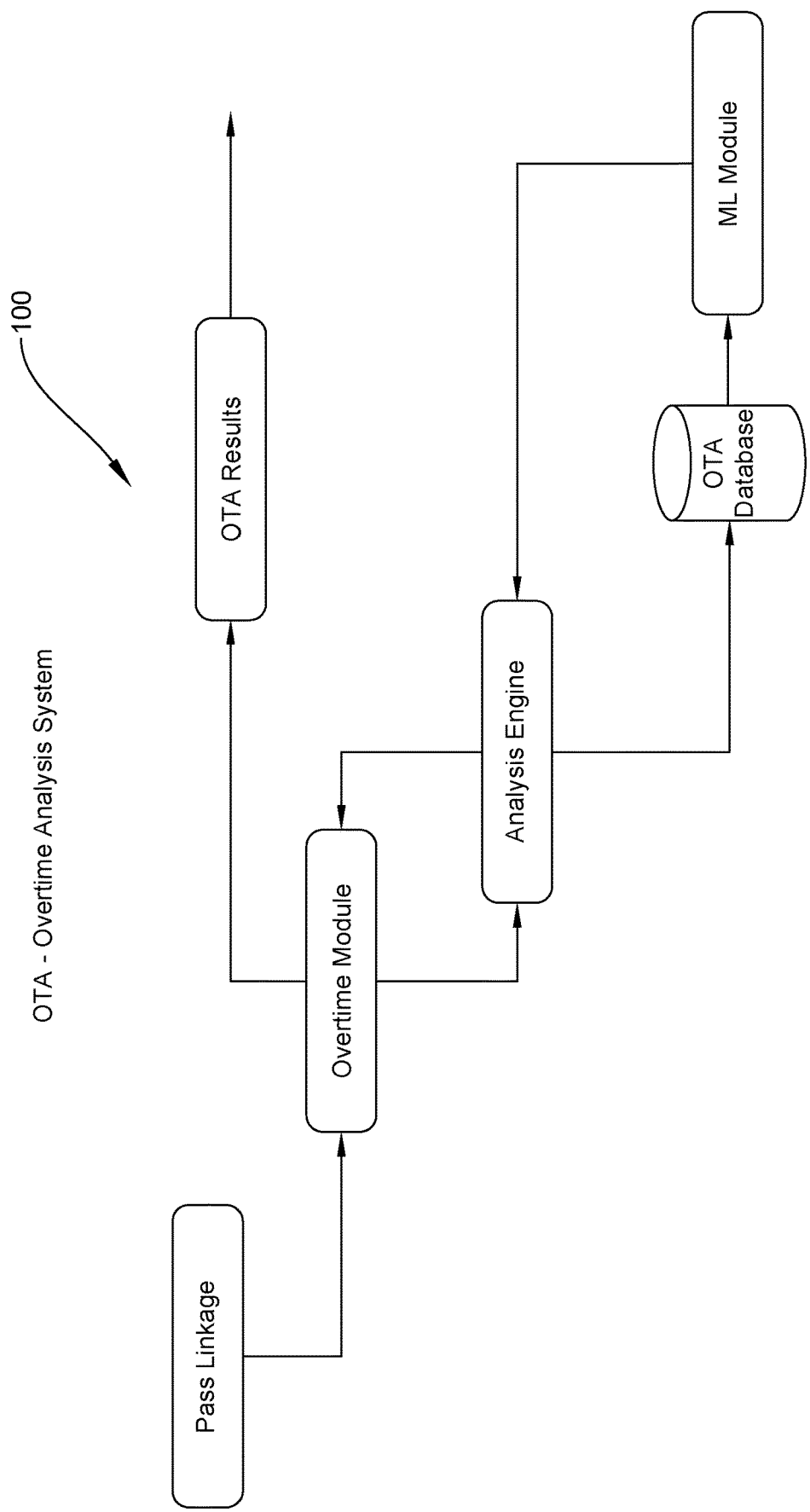
FIG. 3 provides a schematic block diagram of a method for over time analysis according to the preferred embodiment of the present invention.

As best described in conjunction with FIG. 3, an OTA analysis System 300 provide an analysis engine in which captured data and responses over time are passed to the analysis module 252. The passed link data is stored in the OTA database 260 and communicated to a processor 312 in which the relationships are compared, measured and re-measured for analysis 314 to identify changes in authentication data over time. The identity verification data is monitored over time 316 and stored to the EMF linking database 262. Each targeted data set of event interactions as measured and classified may be linked and communicated 310 to an overtime module 320 in which continuous analysis is used to augment the data set over time. An analysis engine 330 provides continuous review and update of the data set to provides OTA results 350 that are current, i.e., up to date. This review of collected data of query-response challenges (checking both answers and time-to-respond) involving direct examination and behavioral observations using social media posts it thereby continuously updated over time to continuously qualify and quantify variations in authentication information over time.

Figure 4:
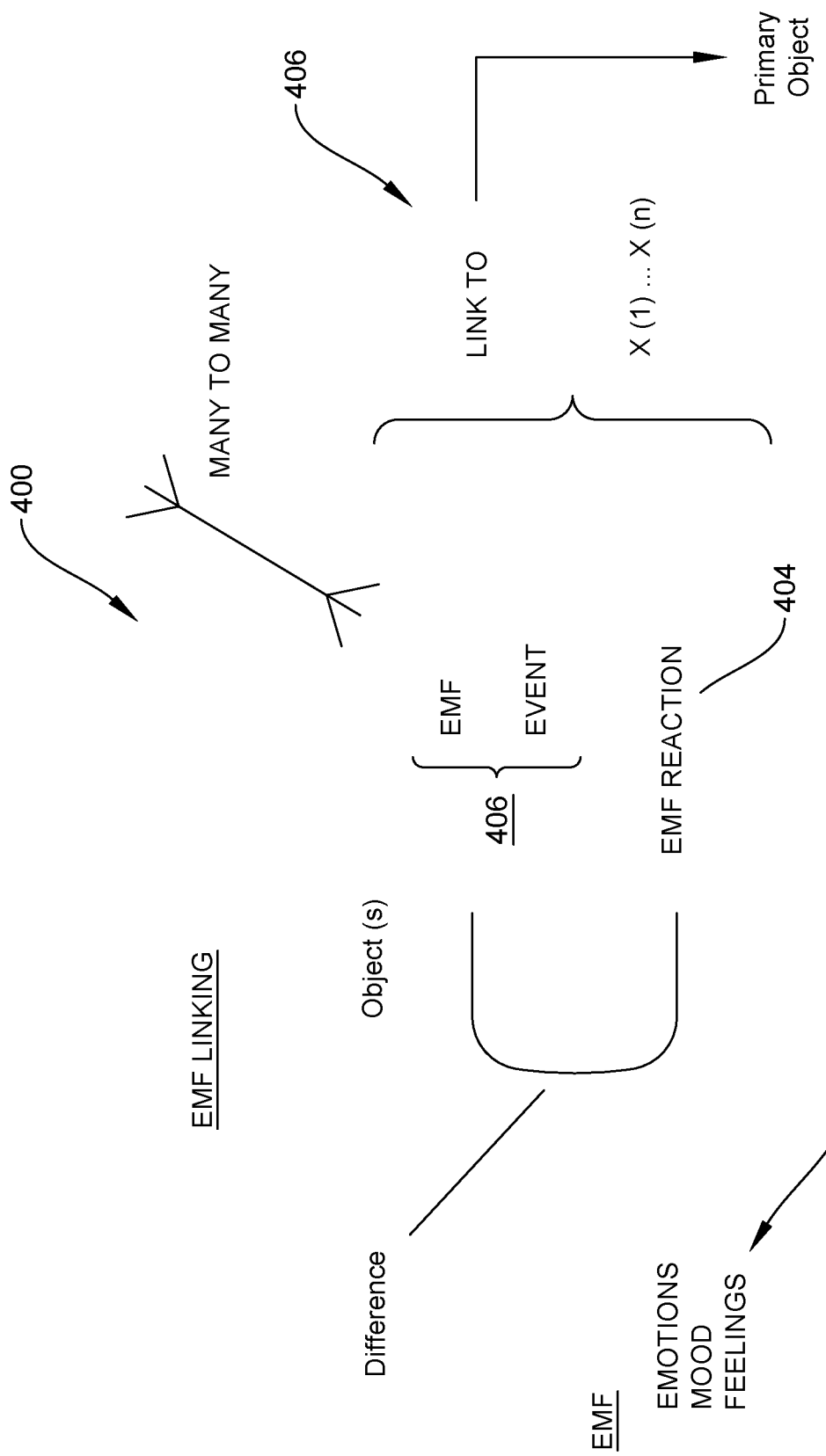
FIG. 4 provides a schematic block diagram of a method for EMF linking according to the preferred embodiment of the present invention.

As best described in conjunction with FIG. 4, an EMF linking system 400 provides an analysis engine in which emotions, moods and feelings (EMF) are measured and captured 402 and an EMF reaction 404 are measured in response to an EMF event 404. Such EMF responses are then linked 406 to the initiating stimulus and stored to the EMF linking database 262 and communicated to a processor 312 in which the relationships are compared, measured and re-measure for analysis 314 to identify changes in authentication data over time. The identity verification data is monitored over time 316 and stored to the EMF linking database 262. Each identified EMF response linkage may be communicated to the EMF/OTA processor 340 in which continuous analysis (use bot language) augments the data set over time. Similar to the OTA results from 350, the analysis engine 330 provides continuous review and update of the data set to provides EMF results 406 that are current, i.e., up to date. This review of collected data of query-response challenges (checking both answers and time-to-respond) involving direct examination and behavioral observations using social media posts is thereby continuously updated over time to continuously qualify and quantify variations in authentication information over time.

In order to calibrate a quality and confidence levels for a particular identification for real persons, the emotional and behavioral systems look at as much information as possible in order to make the most accurate assessment of the individual. Identifying characteristics, such as facial emotion, is publicly available with emotion databases including posed facial expressions. In some posed expression databases, the participants are asked to display different basic emotional expressions, while in spontaneous expression databases, the expressions are natural. The goal of the present invention is to fuse the information found between and among such databases, recognizing Posed-vs-Expression Type data.

Speech Emotion produced in a state of fear, anger, or joy becomes fast, loud, and precisely enunciated, with a higher and wider range in pitch, whereas emotions such as tiredness, boredom, or sadness tend to generate slow, low-pitched, and slurred speech. This allows the ability to look upon the differences pitch, speed/rate, intonation, stress, and rhythm and attain subjective categorization to identify categories to place these samples in (e.g., 'anger', 'approval', etc.) All of this is accomplished thru analyzing pattern recognition through many characteristics, such as accent, pitch, contour, lowering, rate, frequency, breathiness, loudness, pitch and pause discontinuity. In addition to such audible characteristics, visual emotion may also be observed. Observational assessment useful in identification and quantification include fear, anxiety and avoidance. Additionally, gestures may be efficiently used as a means of detecting a particular emotional state of the user, especially when used in conjunction with speech and face recognition. Closely related to gestures are physiological signs, such as gait.

In integrating and fusing data from these various sources, numerous algorithms and classifiers may be implemented to provide a determination methodology. These may include, inter alia, artificial neural networks (ANN, including "deep learning" architectures), decision tree algorithms (CART and ID3/C4.5/C5.0, hidden Markov models (HMMs), k-nearest neighbor algorithms (k-NN), support vector machines (SVM), linear discriminant classifiers (LDC), logistic regression, and Gaussian mixture model (GMM). Utilizing one or more of such methodologies, expected decision accuracy of 70 to 85% or more may be obtained, versus the typical human accuracy of (approximately) 60%.

Such analysis may be performed based on actions and responses to a particular event. By applying emotional understanding to a given event, the actions and responses may be classified to an emotional output. This is done by extracting meaningful patterns and applying an inference engine to create assumptions, and compare and finally predict possible outcomes. This process may be iterated and compared to the previous outcomes in order to validate the assumptions.

Ultimately, the preferred embodiment of the present invention provides additional improvements in the creation of an identity trust solution, offered as a service, where a Governor provides validation of an entity's digital identity on behalf of a Member's request. The entity's digital identity is provided in real-time in the form of the creation of a MyD (a particular type of a formal identity credential, in either a physical or digital instantiation) or the validation of an existing MyD the along with the trust (proof) and confidence level in that trust that they are who they say they are, at that moment. This is accomplished by tackling the root problem of identity, which is identifying the entity for actually being the entity, taking a whole-of-available-evidence (and fusing potentially varying degrees of information) rather than inferring it from single sets of specific documents. As a result, MyD provides a measurable Trust Score for the identification, similar to the credit rating process, along with a Confidence Score in that Trust.

This is done using multi-factor processes integrated with the proprietary data fusion process to generate a MyD determination (new MyD issuance or existing MyD validation) in real time. Working with currently available methods, like documents which prove access to privileges such as a driver's license, corporate certificate, or passport, with biometrics if available, the MyD is also aggregated with AI-based behavioral and emotional metrics unique to an entity when that entity is an individual, all accumulated and enhanced over time. Although biometrics, such as optical or fingerprint scans are direct, they are susceptible to hacking and fraud. Thus MyD combines the latest available biometrics and the emotional behavioral understandings of the individual, when the entity is an individual, to create another layer of proof. The platform utilizes a community of Members focused on the particular entity being identified that provide further validation and proof of the entity, which improves trust over time. With the Dynamically Evolving rules and matching engine, through the network of validation and verification nodes, MyD provides the next generation of identity solutions. MyD provided as a service, operates on a distributed node, and centralized validation network. MyD provides validation and verification confidence levels around the Trust Score, which saves effort and money, reduces fraud and identity theft, providing Members the ease and confidence to perform their desired transactions.

By way of further explanation, it may be helpful, by comparison, to briefly describe what the present invention does not perform. The present invention is not intended to recreate existing recognition biotechnologies or data bases, such as facial or voice print. Rather, it is intended to aggregate use of various databases against which identity is verified. Databases such as NCIC, Equifax, FICO, IBM, Amex includes data already linked to an entity, and are important to help with MyD's confidence scores and trust values. There are also various forms of identification that may be used, including passports, driver's license, birth certificates, credit cards, corporate ID cards, etc. However, this third party data may be used, not captured, in an enhanced use with the combination of other factors to help produce the confidence score for the trust value for each identity verification.

It is the algorithmic integration of existing sources and additional emotional and behavioral datasets that allow for the generation of a "confidence score" and "trust score". Such a determination adds the element of how confident an application can be in the MyD determination of trust (in a particular identify verification) based on the congruity and alignment of the parts that make up the whole picture of information developed. With the addition of emotional recognition systems, a confidence score in an identity validation trust score can be made even higher or, alternately, for a request for further information can be initiated if needed to obtain a confidence score threshold high enough as predetermined to be required for the particular validation request and resulting trust score.

2. Operation of the Preferred Embodiment

In operation, the present invention improves a system that provides both proof ("trust score") and confidence levels of identity at a given moment, in combination a "MyD". The system operates through an ensemble network of members and partners in communication with a counting machine to create a MyD that can be communicated to the requestor (a member or entity) in real-time. The MyD 110 provides a unique identifier that includes a trust component and a confidence component. A governor provides operational control of the counting machine. As should be apparent to those having ordinary skill in the relevant art, in light of the present teachings, the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation. In operation, an electronic device determines, based on an entity profile item, a first list of entity profile attributes. The electronic device filters the list of entity profile attributes, based on data associated with the entity, to generate a second and final list of entity profile attributes. Entity profile attributes in the second and final list are associated with respective attributes that can be ascertained or measured. The device determines values for one or more of the entity attributes and generates a ranked list of entity profile items based on the second, final list of entity profile items, including determining a degree of correlation between the respective attributes of the respective content items of the second list content items on the device, and the value of the one or more physical parameters of the entity if these are available. The device provides, using the ranked list of content items, one or more second content items from the second list for use for entity identity verification.

The present invention is presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical,* 520 US 17 (1997) or *Festo Corp. v. Shoketsu Kinzoku Kogyo Kabushiki Co.,* 535 U.S. 722 (2002), or other similar caselaw or subsequent precedent should not be made if any future claims are added or amended subsequent to this Patent Application.

What is claimed is:

1. A system for qualifying collected data for specific entities, comprising:
    a managed secure-immutable-nonreputable-replicated-verifiable and fault-tolerant distributed datastore;
    an ensemble-based network of both existing and newly-created heterogenous single- and multi-factor ID validation services, including commercial organizations requiring valid entity IDs and service providers supplying technology services for ID validation;
    an intelligent gateway for validation, verification, and trusted confidence values of an entity for each type and level of identification needed, utilizing a combination of distributed and centralized systems, rules, and preferences;
    a peer-to-peer blockchain system for processing, implementing, and cross-checking identification validation parameters and results;
    an analysis module for monitoring and analyzing validation data changes over time, comparing historical data with newly received identification verification parameters and emotional, mood, or feeling responses to emotional, mood, or feeling prompts, and storing changes and iterative analysis results as part of the data record with continuous updating; and
    a confidence score and/or trust score module for augmenting confidence and/or trust scores with additional data that is independent of any other specific available data already available.

2. The system of claim 1, wherein the collected data is obtained digitally, including data that has been created digitally and data that has been digitized from physical sources.

3. The system of claim 1, wherein the ensemble-based network includes members and partners, with members requiring valid entity IDs for use during various events and partners supplying technology services for ID validation as standalone services or as licensed by members.

4. The system of claim 1, wherein emotional, mood, or feeling responses are included as part of the data record for consideration within a confidence score and/or trust score that is independent of any other specific available data already available.

5. The system of claim 1, wherein the confidence score and/or trust score module is configured to track historical data changes and analyze a vector of changes to further augment confidence scores and/or trust scores with additional independent data.

6. A system for qualifying collected data, comprising:
    a collected data server configured to retain collected data of query-response challenges and direct examination of transaction history data;
    a behavioral tracing system configured to analyze the acquired information from a client interface in response to the content from the collected data server, the behavioral tracing system comprising an interface module configured to receive inputted behavioral observations of the client using social media posts, biometrics including facial recognition, eyeball scans, fingerprints, voice prints, keyboard-typing speed and patterns, gait, and to categorize and save the content and observational feedback in the events interaction database, wherein behavioral observations are measured and a historical archive is maintained in a measurement database, and behavioral events and observations are classified and archived in a behavior classification database;
    the client interface configured to access a behavioral presentation application and a behavioral tracing application generated from the behavioral tracing system, and to enable a plurality of client interfaces to operate simultaneously; and
    the networks configured to communicate over one or more networks and to include an ensemble network in which public network elements, cloud networks, and enterprise networks are in operational communication, and further comprising both centralized and federated identity verification services in a manner to provide an ability to pool the identity-verification abilities of potential competitors.

7. The system of claim 6, wherein the behavioral tracing system further comprises a behavior data analysis module configured to actively trace changes and behavioral responses and to provide an analysis of differential changes in client response in relation to recorded historical norms.

8. The system of claim 6, wherein the behavioral tracing system further comprises an Emotional-Mood-Feelings (EMF) linking and tracking system configured to analyze differences in emotions, moods, and feelings as reaction responses to events and/or prompts, and to retain continuous tracking of behavior changes within an overtime analysis database.

9. The system of claim 8, wherein the client interface is further configured to access a reactionary presentation application and a tracking application for analyzing EMF changes over time, and the EMF linking and tracking system further interacts with one or more content server, one or more EMF linking server, and over-time-analysis (OTA) server.

10. The system of claim 9, wherein the OTA analysis system provides an analysis engine in which captured data and responses over time are passed to the analysis module, the passed link data is stored in the OTA database and communicated to a processor in which the relationships are compared, measured and re-measured for analysis to identify changes in authentication data over time, and the identity verification data is monitored over time and stored to the EMF linking database.

* * * * *